US009459126B2

(12) United States Patent
Verhaagen et al.

(10) Patent No.: US 9,459,126 B2
(45) Date of Patent: Oct. 4, 2016

(54) FLOW METER (71) Applicant: Dieterich Standard, Inc., Boulder, CO (US)

(72) Inventors: Donald Robert Verhaagen, Boulder, CO (US); Chad Andrew Steffl, Boulder, CO (US); Fred Shattell, Boulder, CO (US); Mike Hering, Boulder, CO (US); Darrel Coleman, Boulder, CO (US); Paul Snyder, Boulder, CO (US); Joe Rehn, Boulder, CO (US)

(73) Assignee: Dieterich Standard, Inc., Boulder, CO (US)

( * ) Notice: Subject to any disclaimer, the term of this patent is extended or adjusted under 35 U.S.C. 154(b) by 0 days.

(21) Appl. No.: 14/497,556

(22) Filed: Sep. 26, 2014

(65) Prior Publication Data

US 2015/0300850 A1 Oct. 22, 2015

Related U.S. Application Data

(60) Provisional application No. 61/980,176, filed on Apr. 16, 2014.

(51) Int. Cl.
*G01F 1/42* (2006.01)
*G01F 1/37* (2006.01)
*G01F 15/18* (2006.01)

(52) U.S. Cl.
CPC ............... *G01F 1/42* (2013.01); *G01F 1/372* (2013.01); *G01F 15/185* (2013.01)

(58) Field of Classification Search
CPC ........... G01F 1/44; G01F 1/66; G01F 1/1502

USPC ............... 73/861.02, 861.61, 861.63, 861.29
See application file for complete search history.

(56) References Cited

U.S. PATENT DOCUMENTS 2,871,881 A * 2/1959 Hewson .................. F16K 27/00
137/340
3,267,729 A * 8/1966 Cowburn .................. G01F 1/50
73/861.01

(Continued)

FOREIGN PATENT DOCUMENTS

| CN | 201476819 U | 5/2010 |
| GB | 1 202 147 | 8/1970 |

(Continued)

OTHER PUBLICATIONS

"Instrument Manifolds for the Process and Gas Industries", PGI International, 16101 Vallen Drive, Houston, TX, pp. 1-67,May 2002.

(Continued)

*Primary Examiner* — Jewel V Thompson
(74) *Attorney, Agent, or Firm* — Westman, Champlin & Koehler, P.A.

(57) ABSTRACT

A flow meter includes a meter section formed from a single stock of material and having a first inner pipe portion, a second inner pipe portion and an orifice plate defined between the first inner pipe portion and the second inner pipe portion, wherein the orifice plate has an orifice with a cross-sectional area that is less than a cross-sectional area of the first inner pipe portion. The flow meter further includes a first pipe connecting section connected to a first side of the meter section and having a pipe flange and a second pipe connection section connected to a second side of the meter section and having a second pipe flange.

17 Claims, 6 Drawing Sheets

(56) References Cited

U.S. PATENT DOCUMENTS

| | | | | |
|---|---|---|---|---|
| 4,151,745 | A | * | 5/1979 | Cordy .................... G01F 1/42 116/200 |
| 4,182,362 | A | | 1/1980 | Hewson et al. |
| 4,343,193 | A | * | 8/1982 | Dawson .................... G01F 1/42 73/861.61 |
| 4,434,655 | A | * | 3/1984 | Summerfield ......... G01N 25/50 73/167 |
| 4,738,276 | A | * | 4/1988 | Adams .................... F16K 11/20 137/343 |
| 5,542,450 | A | * | 8/1996 | King ........................ B67D 7/20 137/334 |
| 5,762,100 | A | | 6/1998 | Wilda et al. |
| 5,980,466 | A | | 11/1999 | Thomson |
| 6,176,262 | B1 | | 1/2001 | Nimberger |
| 6,591,695 | B1 | | 7/2003 | Brookshire et al. |
| 6,914,531 | B1 | * | 7/2005 | Young .................... A62C 35/68 340/606 |
| 6,945,123 | B1 | | 9/2005 | Kuchl et al. |
| 2005/0210999 | A1 | * | 9/2005 | Sylvia .................... G01F 1/662 73/861.29 |
| 2006/0122739 | A1 | | 6/2006 | Fandrey et al. |
| 2007/0034018 | A1 | * | 2/2007 | Bell .......................... G01F 1/42 73/861.63 |
| 2012/0048031 | A1 | * | 3/2012 | Furlong .................... G01F 1/74 73/861.04 |
| 2015/0276437 | A1 | * | 10/2015 | Palmiscno ............. G01D 11/30 73/866.5 |

FOREIGN PATENT DOCUMENTS

| | | |
|---|---|---|
| GB | 2 301 676 | 12/1996 |
| JP | H04-1525 | 1/1992 |

OTHER PUBLICATIONS

Notification of Transmittal of the International Search Report and the Written Opinion of the International Searching Authority, from PCT/US2015/024460, dated Jul. 15, 2015.

Notification of Transmittal of the International Search Report and the Written Opinion of the International Searching Authority, from PCT/US2015/038967, dated Sep. 9, 2015.

* cited by examiner

FLOW METER

CROSS-REFERENCE TO RELATED APPLICATION

The present application is based on and claims the benefit of U.S. provisional patent application Ser. No. 61/980,176, filed Apr. 16, 2014, the content of which is hereby incorporated by reference in its entirety.

BACKGROUND

Embodiments described below relate to process control devices. In particular, the embodiments relate to flow meters used in process environments.

In process control environments, it is advantageous to monitor the amount of fluids passing through various conduits within the process system. Various techniques have been developed to measure the flow rates including mechanical flow meters, pressure based meters, optical flow meters, vortex flow meters, electromagnetic flow meters, ultrasonic flow meters, and Coriolis flow meters, for example.

Mechanical flow meters place physical elements in the fluid stream that move in response to the fluid flow. One example of a mechanical flow meter is the turbine flow meter, in which a turbine rotor is set in the path of a fluid stream which imparts a force on the blade surfaces of the rotor to cause the turbine to rotate. The speed at which the rotor rotates indicates the velocity of the fluid flow.

In vortex meters, a bluff body is introduced into the fluid flow and the frequency at which vortices are formed behind the bluff body is used as a measure of the fluid flow. In some vortex meters, the vortices are measured using pressure sensors that measure pressure changes associated with vortices.

In ultrasonic meters, an ultrasonic signal is passed through the conduit in both an upstream and downstream direction through the fluid flow. The difference in the speed at which the ultrasonic signal passes upstream versus downstream is used to calculate the fluid flow.

In pressure based meters, the pressure along one or more points within the conduit is used to determine the flow rate of the fluid. Many pressure-based meters introduce a constriction in the fluid flow and sense the pressure before the constriction and the pressure after or within the constriction. One example of a pressure-based meter utilizes an orifice plate with a hole, or a plurality of holes through it. In such meters, a differential pressure sensor is used that senses the difference in the pressure before and after the orifice plate.

The discussion above is merely provided for general background information and is not intended to be used as an aid in determining the scope of the claimed subject matter. The claimed subject matter is not limited to implementations that solve any or all disadvantages noted in the background.

SUMMARY

A flow meter includes a meter section formed from a single stock of material and having a first inner pipe portion, a second inner pipe portion and an orifice plate defined between the first inner pipe portion and the second inner pipe portion, wherein the orifice plate has an orifice with a cross-sectional area that is less than a cross-sectional area of the first inner pipe portion. The flow meter further includes a first pipe connecting section connected to a first side of the meter section and having a pipe flange and a second pipe connection section connected to a second side of the meter section and having a second pipe flange.

A further embodiment of a flow meter includes a meter section formed of a single piece of material machined to form a first weld shoulder, a second weld shoulder, a first conduit forming an opening at the first weld shoulder, a second conduit forming an opening at the second weld shoulder and an orifice plate between the first conduit and the second conduit.

A method includes machining a single piece of material to form a first threaded bore on a first side; a second threaded bore on a second side opposite the first side; a first pipe section on a third side; a second pipe section on a fourth side opposite the third side; and an orifice plate between the first pipe section and the second pipe section.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

Embodiments described below provide a flow meter that can be used to provide accurate flow rate measurements of cryogenic fluids in environments where the flow meter would be susceptible to vibration affects. The flow meter is particularly effective in measuring fluid flows through smaller conduits such as one inch diameter conduits and in measuring low flow rates.

Currently, it is extremely difficult to measure fluid flow in a small line size, at a low flow rate, at a low flow velocity, at cryogenic temperatures without failing. For example, flow meters that utilize an orifice plate compressed between two flanges have lacked the accuracy needed to measure low flow rate cryogenic fluids in small diameter conduits. The primary cause of this inaccuracy is believed to be off-center positioning of the opening of the orifice plate within the conduits as a result of manual positioning of the orifice plate between the two flanges. As the line size decreases, this centering offset becomes increasingly more significant to the measured pressures and thus to the measured flow rate. In addition, orifice plates that are compressed between two flanges are held in place by gaskets that become brittle when exposed to cryogenic temperatures and eventually fail to seal properly.

Vortex flow meters have been used for cryogenic applications but may not provide accurate measurements in low flow/low velocity applications in a one inch line size. Ultrasonic flow meters have also been used in cryogenic applications but have been found to only be accurate in line sizes of four inches or above. Turbine flow meters include a large number of moving parts that are susceptible to failure at cryogenic temperatures. These failures typically take the form of broken blades or cracked ball bearing assemblies.

Cryogenic flow meters have also been susceptible to inaccuracies due to the low thermal mass of the flow meters. Such low thermal masses cause uneven temperature distributions along the meter section when a portion of the meter section is exposed to a localized heat source, such as sunlight that falls on only a portion of the meter section. Uneven temperature distribution across the meter section can cause uneven phase changes across the meter section resulting in decreased in flow rate accuracy.

Figure 1:
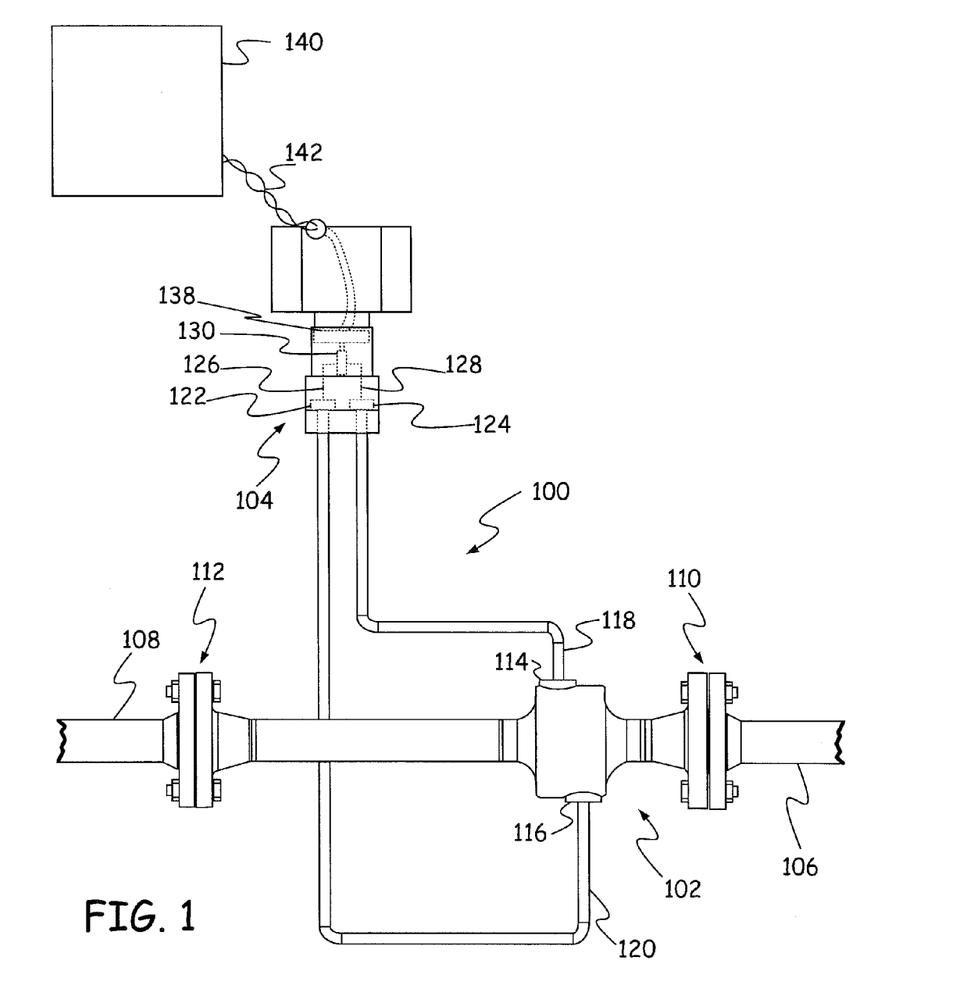
FIG. 1 is a block diagram of a portion of a process control environment.
Figure 2:
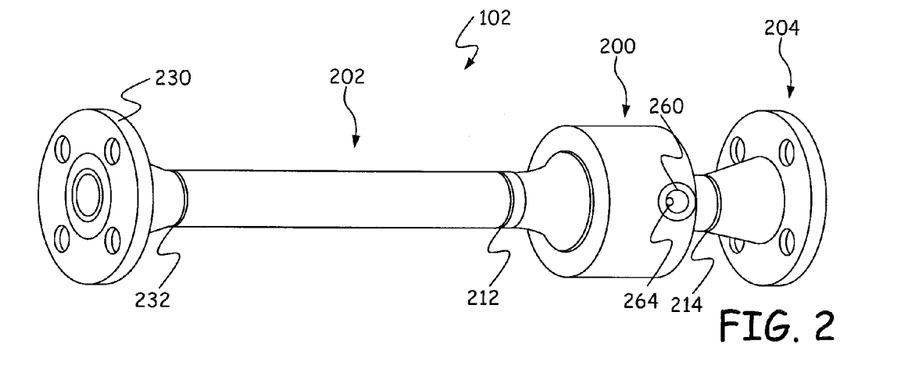
FIG. 2 is a perspective view of a flow meter in accordance with one embodiment.
Figure 3:
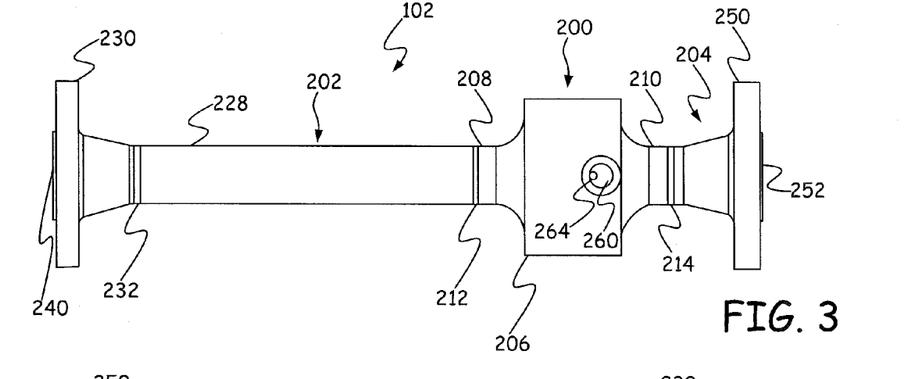
FIG. 3 is a right side view of the flow meter of FIG. 2.
Figure 4:
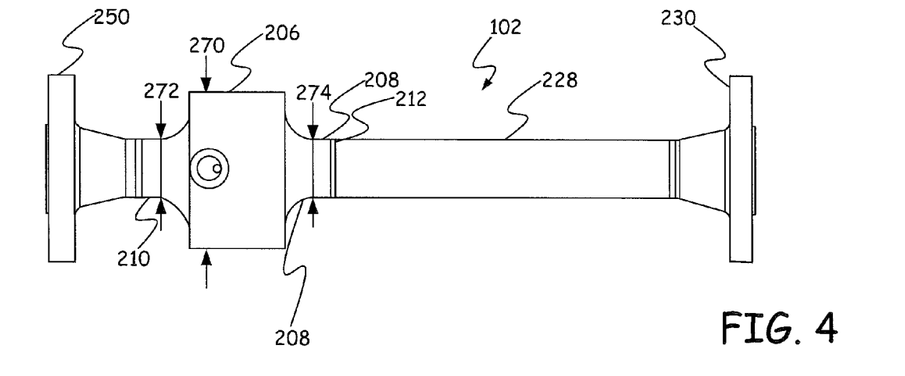
FIG. 4 is a left side view of the flow meter of FIG. 2.
Figure 5:
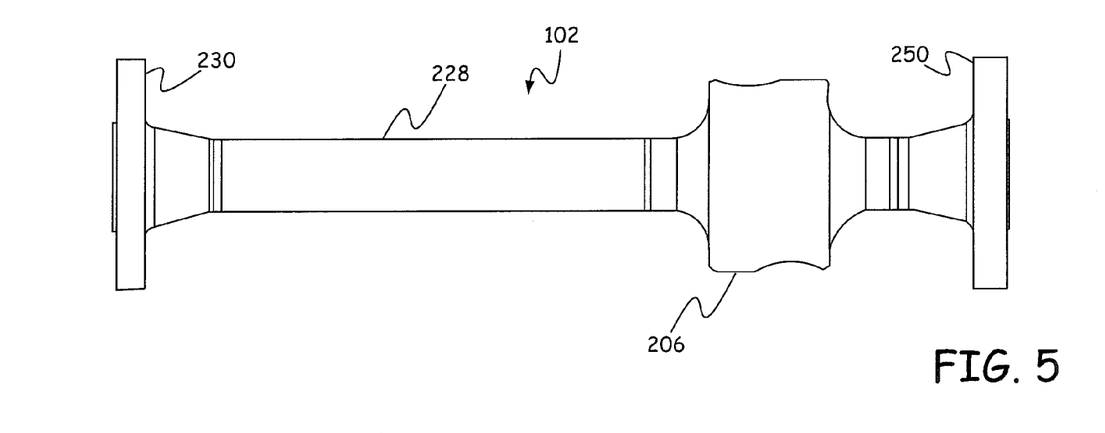
FIG. 5 is a top view of the flow meter of FIG. 2.
Figure 6:
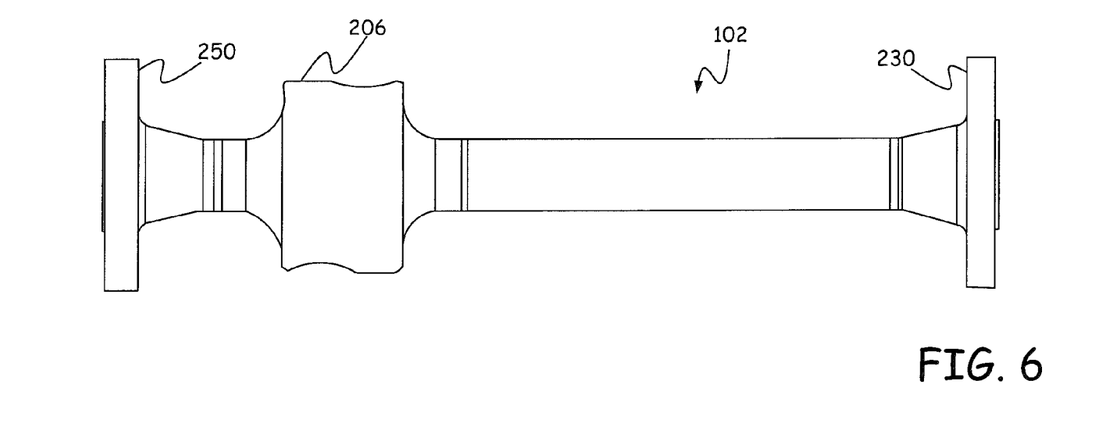
FIG. 6 is a bottom view of the flow meter of FIG. 2.
Figure 7:
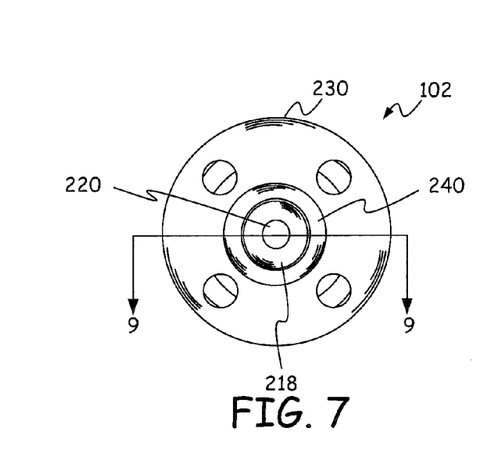
FIG. 7 is a front view of the flow meter of FIG. 2.
Figure 8:
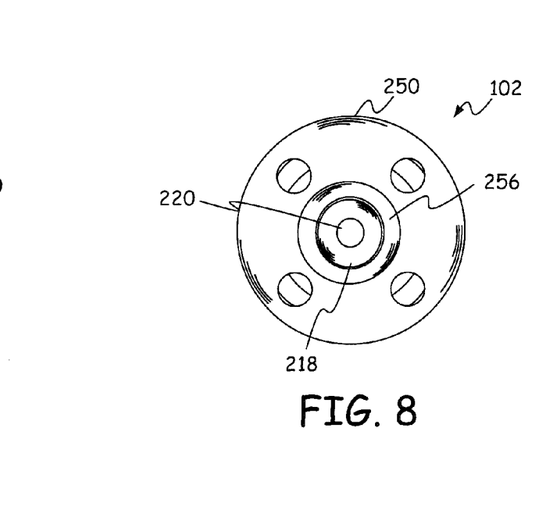
FIG. 8 is a back view of the flow meter of FIG. 2.

Pursuant to an example embodiment, FIG. 1 provides a block diagram of a portion of a process control system 100, which includes a flow meter 102, a pressure transmitter 104 and a control room 140. Flow meter 102 is mounted to conduits 106 and 108 using flange fittings 110 and 112. A process fluid flows from conduit 108 through flow meter 102 and into conduit 106. Flow meter 102 includes two threaded taps that receive respective universal capillary fittings 114 and 116. Capillary fittings 114 and 116 connect respective capillaries 118 and 120 to flow meter 102. The two threaded taps are in fluid communication with respective corner taps machined into flow meter 102, with one corner tap on each side of an orifice plate that is also machined into flow meter 102. As a result, capillary 118 is in fluid communication with one side of the orifice plate and capillary 120 is in fluid communication with the opposite side of the orifice plate. In other embodiments, universal capillary fittings 114 and 116 include sealing diaphragms that seal a fill fluid in capillaries 118 and 120 from the process fluid in flow meter 102.

Capillary 118 contains a fluid, either the process fluid or a fill fluid, that transmits the pressure of the process fluid on one side of the orifice plate to a diaphragm 124 in pressure transmitter 104. Capillary 120 also contains a fluid, either the process fluid or a fill fluid, that transmits the pressure of the process fluid on an opposite side of the orifice plate to a diaphragm 122 in pressure transmitter 104. The opposite sides of diaphragms 122 and 124 are connected to respective capillaries 126 and 128, which are filled with a fill fluid. Deflection of diaphragms 122 and 124 in response to the pressure of the fluid in capillaries 118 and 120, cause the pressure to be transmitted to the fill fluid in capillaries 126 and 128. The differential pressure between the fill fluid of capillary 126 and the fill fluid of capillary 128 is sensed by a differential pressure sensor 130. Sensor 130 provides sensor values to circuit elements 138, which use the sensor values to generate one or more process variables that are transmitted to a control room 140. The process variables can include one or more of static pressure values, differential pressure values, flow rates, volumetric flow rates, and mass flow rates, for example. The process variables can be transmitted through a wired communication path such as a two wire process loop 142 or may be communicated to control room 140 using a wireless communication path.

According to various embodiments, FIGS. 2-9 provide a perspective view, a right side view, a left side view, a top view, a bottom view, a front view, a back view, and a sectional view, respectively, of flow meter 102. Flow meter 102 includes a meter section 200, a first pipe connecting section 202 and a second pipe connecting section 204. Meter section 200 includes a central body 206, a first weld shoulder 208 on a first side of meter section 200 and a second weld shoulder 210 on an opposing side of meter section 200. First pipe connecting section 202, which is also referred to as a first pipe fitting section or a first flange section, is welded to first weld shoulder 208 at a butt weld 212. Second pipe connecting section 204, which is also referred to as a second pipe fitting section or a second flange section, is welded to second weld shoulder 210 at butt weld 214.

Figure 9:
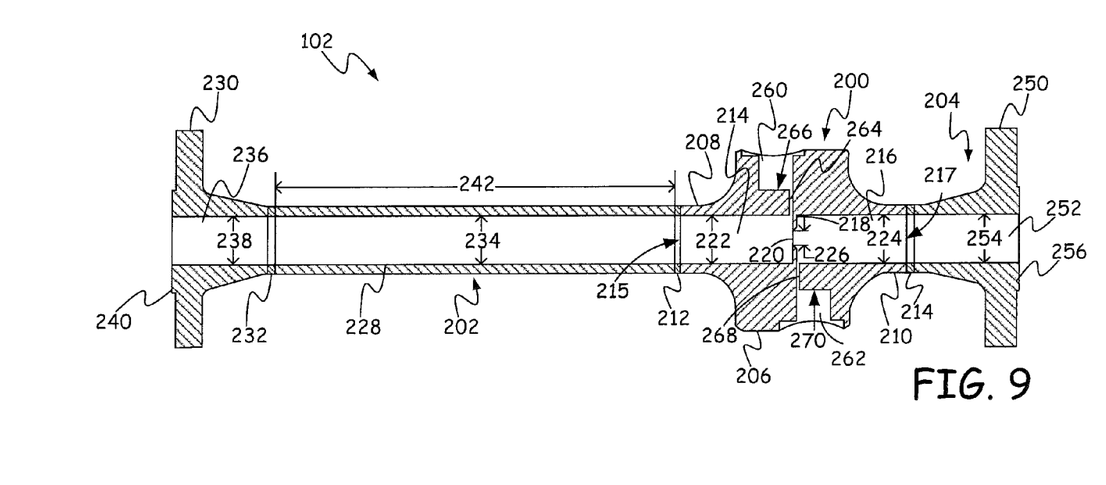
FIG. 9 is a sectional view of the flow meter of FIG. 2

As shown in FIG. 9, meter section 200 includes a first inner pipe portion 214, which is also referred to as a first conduit or a first pipe section, and a second inner pipe portion 216, which is also referred to as a second conduit or second pipe section. First inner pipe portion 214 is separated from second inner pipe portion 216 by an orifice plate 218 that includes an orifice 220 with a cross-sectional area that is less than the cross-sectional area of inner pipe portions 214 and 216. In particular, the diameter 226 of orifice 220 is less than the inner diameter 222 of inner pipe section 214 and is less than the inner diameter 224 of inner pipe section 216. It is appreciated that orifice plate 218 may comprise a single hole or multiple hole configuration. First inner pipe portion 214 extends from opening 215 of weld shoulder 208 to one side of orifice plate 218 and second inner pipe portion 216 extends from opening 217 of weld shoulder 210 to the other side of orifice plate 218.

First pipe connecting section 202 includes conduit 228 and mounting flange or pipe flange 230, which is welded to conduit 228 at butt weld 232. Conduit 228 includes an inner diameter 234 that in one embodiment is the same as inner diameter 222 of first inner pipe portion 214. Pipe flange 230 includes an inner pipe portion 236 that has an inner diameter 238 that in one embodiment is the same as inner diameter 234 of conduit 228. Pipe flange 230 includes a sealing surface 240 that can be compressed when pipe flange 230 is connected to a pipe flange on a conduit, such as conduit 108 of FIG. 1. Conduit 228 includes a length 242 that is sufficient to condition the flow before it reaches orifice plate 218.

Second pipe connecting section 204 includes a second pipe flange 250 and an inner pipe portion 252 with an inner diameter 254 that in accordance with one embodiment is the same as inner diameter 224 of second inner pipe portion 216. Pipe connecting section 204 also includes sealing surface 256, which may be compressed to form a seal when flange 250 is connected to a mating flange on a conduit, such as conduit 106 of FIG. 1. Pipe connecting section 204 does not include a conduit such as conduit 228 of first pipe connecting section 202 and as a result has a smaller length than first pipe connecting section 202. A conduit is not needed in second pipe connecting section 204 because the flow does not need to be conditioned after the orifice plate.

Central body 206 of meter section 200 also includes two threaded taps or bores 260 and 262 on opposite sides of central body 206. In accordance with one embodiment, threaded taps or bores 260 and 262 are sized to accept a universal capillary fitting. A corner tap 264 is machined in the bottom 266 of tap 260 to provide fluid communication between tap 260 and inner pipe portion 214. Similarly, a corner tap 268 is machined in a bottom 270 of threaded tap or bore 262 to provide fluid communication between threaded tap 262 and inner pipe portion 216. In accordance with one embodiment, corner tap 264 is positioned directly next to orifice plate 218 and corner tap 268 is positioned directly next to an opposing side of orifice plate 218.

In accordance with one embodiment, meter section 200 is machined from a single stock or piece of material by selectively removing material to form inner pipe portions 214 and 216, shoulders 208 and 210, threaded bores 260 and 262, corner taps 264 and 268 and orifice 220 of orifice plate 218. Note that orifice plate 218 is formed by removing material to form inner pipe portion 214 and 216 while leaving intact the portion of meter section 200 that defines orifice plate 218. In addition, meter section 200 is machined such that central body 206 has an outer diameter 270 (FIG. 4) that is greater than the outer diameters 272 and 274 of weld shoulders 208 and 210. The larger diameter of central body 206 provides additional material that can be machined to form bores 260 and 262. In addition, the added diameter provides additional thermal mass to meter section 200 such that the thermal mass of meter section 200 is large enough ensure a single-phase flow through meter section 200. In addition, the mass of meter section 200 is large enough to dampen inertial vibrations associated with offloading cryogenic fluids from tanker trucks that would otherwise affect the pressure readings determined by sensor 130 in pressure transmitter 104. In accordance with one embodiment, meter section 200 has a mass of at least approximately 5.8 lb or 2631 grams.

Because meter section 202 is machined from a single piece of material, it does not include any elastomer gaskets, which could become brittle in cryogenic settings. Further, meter section 200 does not include any moving parts that would be susceptible to failure under cryogenic conditions. In addition, the use of butt welds, 212, 214 and 232 reduces the likelihood of weld failure since the welds extend from the outer diameter of the conduits to the inner diameters 238, 234, 232, 222, 224 and 254.

In accordance with one embodiment, all of meter 102 is formed of a same material so that all of the elements of the meter expand and contract with temperature evenly. In most embodiments, the material will meet cryogenic requirements such that the material has excellent properties down to at least −325° F. In accordance with one embodiment, "316" stainless steel is used to form flow meter 102. In other embodiments, flow meter 102 is formed from Monel® produced by Special Metals Corporation, thereby enabling sharp edges that would not spark in oxygen service. Monel® (Alloy 400) is a readily available material with a low heat of combustion. Alloy 400 is difficult to ignite and difficult to burn. Copper and many alloys of brass are better material choices for oxygen service, however, their material properties are not desirable for orifice technology. The materials most resistant to ignition are copper alloys and nickel-copper alloys. Monel® is chiefly composed of nickel and copper. Moreover, the aforementioned materials also have the slowest rate of combustion in oxygen service.

Flow meter 102 is rugged and performs well under severe conditions including being placed on a skid for cryogenic flow measurements due to its large mass, lack of moving parts and gaskets, and butt weld construction. In addition, because the taps and bores are machined into meter section 200, the locations of the channel taps are not sensitive to piping errors in the field.

Flow meter 102 may be machined for a variety of ranges of fluid flow including extremely low flow rates and low fluid velocities while maintaining the same inner pipe diameter 222 and 224. In particular, the diameter 226 of orifice 220 can be altered to provide different beta ratios (the ratio of diameter 226 to diameter 222).

Figure 10:
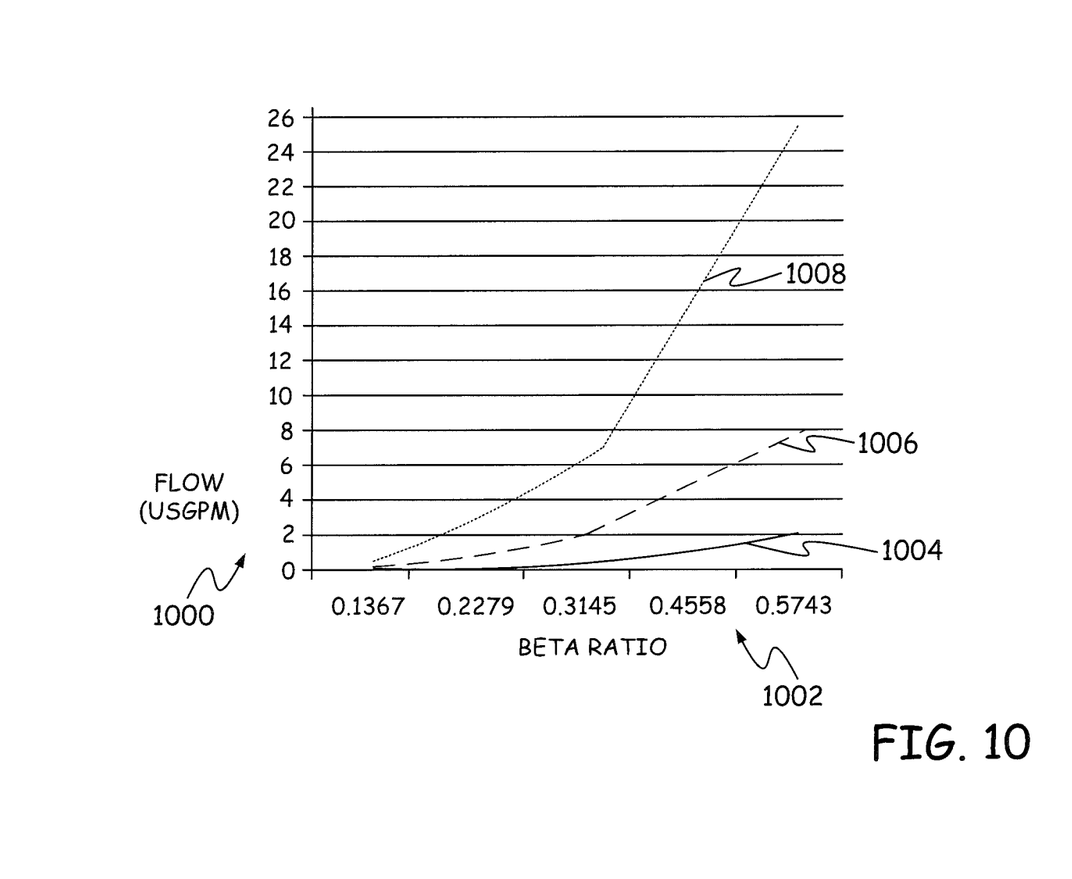
FIG. 10 is graph showing ranges of flows of liquid nitrogen that can be measured for various beta ratios using the flow meter of FIG. 2.

FIG. 10 provides graphs of flow rates shown on vertical axis 1000 for five different beta ratios shown on horizontal axis 1002. For each beta ratio, three separate differential pressures are shown for liquid nitrogen. Graph 1004 represents a differential pressure value of 2 inches of water, graph 1006 represents a differential pressure of 25 inches of water and graph 1008 represents a differential pressure of 250 inches of water. The five beta ratios are standard sizes offered in existing high-temperature flow meters. The differential pressure range between graph 1004 and graph 1008 represents a 100:1 differential pressure turn down found in many pressure transmitters. Other transmitters may have turn down ratios of 150:1 or 200:1. In such transmitters, a wider differential pressure range may be used and thus a wider range of fluid flows may be detected.

Figure 11:
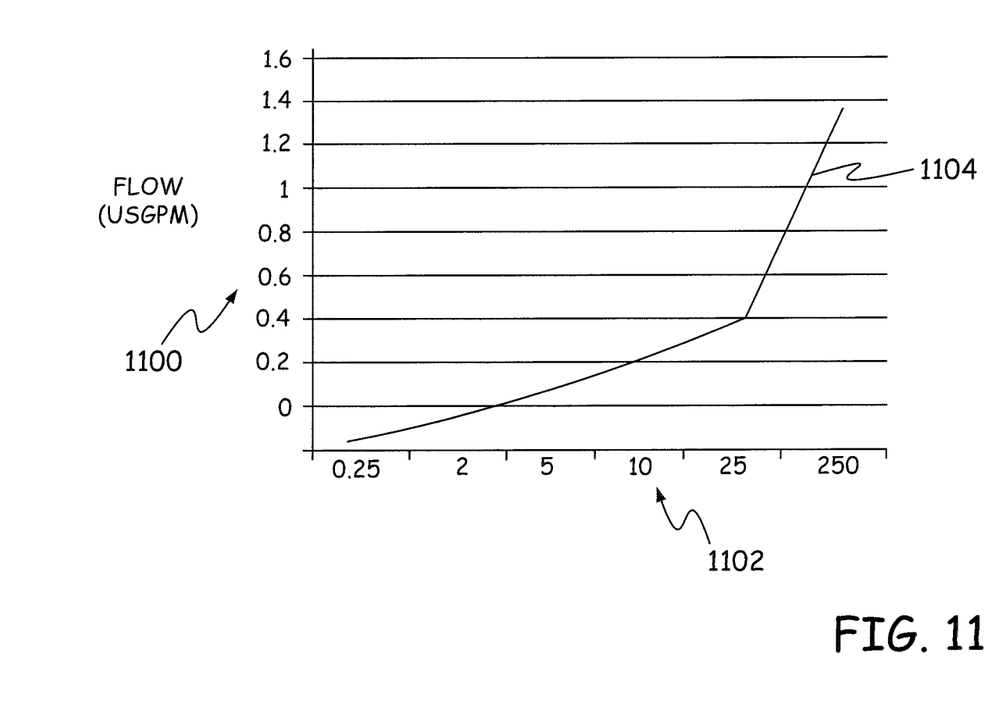
FIG. 11 is a graph of differential pressure values as a function of flow for a beta of 0.1367 using the flow meter of FIG. 2 for liquid nitrogen.

FIG. 11 provides a graph 1104 showing the relationship of differential pressure, shown on horizontal axis 1102, to liquid nitrogen flow, shown on vertical axis 1100 as a function of differential pressure 1102 across an orifice plate with a beta ratio of 0.1367. In FIG. 11, a differential pressure of 0.25 is considered a lower limit for accurate measurement given a full range of flows in a single beta ratio of 27:1 assuming 1.35 USGPM full scale and 0.05 USGPM minimum.

Although flow meter 102 has been described above for use in cryogenic applications, flow meter 102 may also be used in high pressure applications, in applications where leak point reduction is critical, in nuclear environments, in high temperature applications, in applications where there is rapid temperature cycling, in applications requiring sub-sea pressures and in steam injection applications. In addition, although a single orifice is shown in the orifice plate, in other embodiments multiple orifices are present. In addition, although taps 260 and 262 were formed by boring or machining meter section 200, in other embodiments, flange taps may be added externally to central body 206 to provide a means for connecting universal capillary fittings to flow meter 102.

Although a single line size is shown in the Figures above, flow meter 102 may be constructed for multiple different line sizes.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A flow meter comprising:
   a meter section formed from a single stock of material and comprising a first inner pipe portion, a second inner pipe portion and an orifice plate defined between the first inner pipe portion and the second inner pipe portion, wherein the orifice plate has an orifice with a cross-sectional area that is less than a cross-sectional area of the first inner pipe portion;
   a first pipe connecting section connected to a first side of the meter section and having a pipe flange; and
   a second pipe connection section connected to a second side of the meter section and having a second pipe flange.

2. The flow meter of claim 1 wherein the meter section further comprises a central body, a first weld shoulder and a second weld shoulder wherein the first weld shoulder and the second weld shoulder have an outer diameter that is smaller than an outer diameter of the central body.

3. The flow meter of claim 2 wherein the first weld shoulder is welded to the first pipe connecting section.

4. The flow meter of claim 3 wherein the second weld shoulder is welded to the second pipe connecting section.

5. The flow meter of claim 4 wherein the first weld shoulder is butt welded to the first pipe connecting section and the second weld shoulder is butt welded to the second pipe connecting section.

6. The flow meter of claim 1 wherein the meter section has a thermal mass that ensures single phase flow through the meter section.

7. The flow meter of claim 1 wherein the meter section further comprises a first threaded tap on a first side of the orifice plate.

8. The flow meter of claim 7 wherein the meter section further comprises a second threaded tap on a second side of the orifice.

9. The flow meter of claim 7 wherein the first threaded tap is in fluid communication with the first pipe portion through a first corner tap and the second threaded tap is in fluid communication with the second pipe portion through a second corner tap.

10. The flow meter of claim 1 wherein the first pipe connection section is welded to a first side of the meter section and having a pipe flange.

11. The flow meter of claim 1 wherein the second pipe connection section is welded to a second side of the meter section and having a second pipe flange.

12. A flow meter comprising:
a meter section formed of a single piece of material machined to form a first weld shoulder, a second weld shoulder, a first conduit forming an opening at the first weld shoulder, a second conduit forming an opening at the second weld shoulder and an orifice plate between the first conduit and the second conduit.

13. The flow meter of claim 12 further comprising a first flange section having a first end welded to the first weld shoulder and a second end comprising a first flange.

14. The flow meter of claim 13 further comprising a second flange section having a first end welded to the second weld shoulder and a second end comprising a second flange wherein the first flange section has a length that is longer than a length of the second flange section.

15. The flow meter of claim 12 wherein the meter section has a large enough mass to dampen inertial vibrations associated with offloading cryogenic fluids from tanker trucks.

16. The flow meter of claim 12 wherein the meter section has a large enough mass to ensure single phase flow through the meter section.

17. The flow meter of claim 12 wherein the meter section further comprises two threaded taps on opposite sides of the meter section.

* * * * *